United States Patent
Kodaypak

(10) Patent No.: US 10,805,772 B2
(45) Date of Patent: *Oct. 13, 2020

(54) NETWORK DEVICE SELECTION FOR BROADCAST CONTENT

(71) Applicant: AT&T INTELLECTUAL PROPERTY I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,553

(22) Filed: Jan. 18, 2019

(65) Prior Publication Data

US 2019/0158987 A1  May 23, 2019

Related U.S. Application Data

(63) Continuation of application No. 15/989,146, filed on May 24, 2018, now Pat. No. 10,212,559, which is a
(Continued)

(51) Int. Cl.
*H04W 4/06* (2009.01)
*H04W 76/40* (2018.01)
(Continued)

(52) U.S. Cl.
CPC .............. *H04W 4/06* (2013.01); *H04L 12/189* (2013.01); *H04L 65/1069* (2013.01); *H04L 65/4076* (2013.01); *H04W 76/40* (2018.02)

(58) Field of Classification Search
None
See application file for complete search history.

(56) References Cited

U.S. PATENT DOCUMENTS 7,957,745 B2   6/2011  Cai et al.
8,199,741 B2   6/2012  Al et al.
(Continued)

OTHER PUBLICATIONS

Office Action dated Oct. 22, 2019 for U.S. Appl. No. 15/959,150, 13 pages.
(Continued)

*Primary Examiner* — Alpus Hsu
*Assistant Examiner* — Camquyen Thai
(74) *Attorney, Agent, or Firm* — Amin, Turocy & Watson, LLP

(57) ABSTRACT

Providing network device selection for broadcast content is disclosed. Changes to a LTE or LTE-B network can be propagated in real-time, or near-real-time, to a mapping profile representative of the LTE or LTE-B network. This mapping profile can be employed in updating the LTE or LTE-B network. Further, the mapping profile can be employed in establishing a new LTE-B session, adapting an existing LTE-B session, maintaining an existing LTE-B session, etc. Access to a selection rule can enable the LTE or LTE-B network to rank a determined bearer path of the LTE or LTE-B network. LTE-B network and service management can be performed by the LTE-B network or components thereof, such as, at a BMSC component. Moreover, network device selection for broadcast content can be virtualized.

20 Claims, 10 Drawing Sheets

Related U.S. Application Data continuation of application No. 14/825,124, filed on Aug. 12, 2015, now Pat. No. 10,015,640.

(51) Int. Cl.
  *H04L 29/06* (2006.01)
  *H04L 12/18* (2006.01)

(56) References Cited

U.S. PATENT DOCUMENTS

| | | | |
|---|---|---|---|
| 8,233,446 B2 | 7/2012 | Vedantham et al. | |
| 8,320,290 B2 | 11/2012 | Chao et al. | |
| 8,493,891 B2 | 7/2013 | Zhang | |
| 8,611,833 B2 | 12/2013 | Cai et al. | |
| 8,615,271 B2 | 12/2013 | Chuberre et al. | |
| 8,654,757 B2 | 2/2014 | Ai et al. | |
| 8,711,794 B2 | 4/2014 | Yun et al. | |
| 8,797,939 B2 | 8/2014 | Al | |
| 8,855,037 B2 | 10/2014 | Zhai et al. | |
| 8,879,457 B2 | 11/2014 | Zhai et al. | |
| 8,891,426 B2 | 11/2014 | Widegren | |
| 9,042,292 B2 | 5/2015 | Zhang et al. | |
| 9,544,097 B1* | 1/2017 | Vivanco | H04L 1/08 |
| 9,743,312 B1* | 8/2017 | Malhotra | H04W 28/0268 |
| 2004/0025186 A1 | 2/2004 | Jennings et al. | |
| 2007/0058626 A1* | 3/2007 | Keller | H04L 12/189 |
| | | | 370/390 |
| 2007/0275742 A1 | 11/2007 | Zhang | |
| 2010/0135196 A1 | 6/2010 | Cheng et al. | |
| 2010/0265867 A1 | 10/2010 | Becker et al. | |
| 2011/0019589 A1 | 1/2011 | Li et al. | |
| 2011/0026464 A1 | 2/2011 | Chen et al. | |
| 2011/0032858 A1 | 2/2011 | Lohmar et al. | |
| 2011/0051646 A1 | 3/2011 | Rice | |
| 2012/0039262 A1* | 2/2012 | Walsh | H04L 45/04 |
| | | | 370/329 |
| 2012/0155364 A1 | 6/2012 | Kim et al. | |
| 2012/0240167 A1 | 9/2012 | Vasudevan et al. | |
| 2012/0263089 A1* | 10/2012 | Gupta | H04W 72/005 |
| | | | 370/312 |
| 2012/0269110 A1* | 10/2012 | Walker | H04W 28/16 |
| | | | 370/312 |
| 2013/0064160 A1 | 3/2013 | Newberg et al. | |
| 2013/0094428 A1 | 4/2013 | Lee | |
| 2013/0104173 A1 | 4/2013 | Tjio et al. | |
| 2013/0138814 A1 | 5/2013 | Kotecha | |
| 2013/0194999 A1 | 8/2013 | Anchan | |
| 2013/0212166 A1 | 8/2013 | Willig et al. | |
| 2013/0301539 A1 | 11/2013 | Aguirre et al. | |
| 2013/0315125 A1 | 11/2013 | Ravishankar et al. | |
| 2014/0133383 A1 | 5/2014 | Park | |
| 2014/0137161 A1 | 5/2014 | Park | |
| 2014/0153476 A1 | 6/2014 | Wang et al. | |
| 2014/0204830 A1 | 7/2014 | Wang et al. | |
| 2014/0313974 A1 | 10/2014 | Chandramouli et al. | |
| 2015/0036581 A1 | 2/2015 | Etemad et al. | |
| 2015/0040162 A1 | 2/2015 | Kotecha et al. | |
| 2015/0124686 A1 | 5/2015 | Zhang et al. | |
| 2015/0146575 A1* | 5/2015 | Singh | H04L 45/48 |
| | | | 370/256 |
| 2015/0163643 A1 | 6/2015 | Slssingar et al. | |
| 2015/0208209 A1 | 7/2015 | Jamadagni et al. | |
| 2015/0215918 A1 | 7/2015 | Wu et al. | |
| 2015/0236805 A1 | 8/2015 | Mcevilly et al. | |
| 2015/0289232 A1 | 10/2015 | Lohmar et al. | |
| 2015/0365798 A1* | 12/2015 | McEvilly | H04L 12/1845 |
| | | | 455/456.5 |

OTHER PUBLICATIONS

Office Action dated Feb. 24, 2017 for U.S. Appl. No. 14/825,119, 21 pages.

Final Office Action dated Jul. 7, 2017 for U.S. Appl. No. 14/825,119, 20 pages.

Office Action dated Jul. 12, 2017 for U.S. Appl. No. 14/825,124, 44 pages.

Notice of Allowance dated Oct. 1, 2018 for U.S. Appl. No. 15/989,146, 25 pages.

Office Action dated Jul. 3, 2019 for U.S. Appl. No. 15/959,150, 29 pages.

\* cited by examiner

NETWORK DEVICE SELECTION FOR BROADCAST CONTENT

RELATED APPLICATION

The subject patent application is a continuation of, and claims priority to each of, U.S. patent application Ser. No. 15/989,146, filed 24 May 2018, and entitled "NETWORK DEVICE SELECTION FOR BROADCAST CONTENT," which is a continuation of, U.S. patent application Ser. No. 14/825,124, filed Aug. 12, 2015, and entitled "NETWORK DEVICE SELECTION FOR BROADCAST CONTENT," issued 3 Jul. 2018 as U.S. Pat. No. 10,015,640, the entireties of which applications are hereby incorporated by reference herein.

TECHNICAL FIELD

The disclosed subject matter relates to network device selection, e.g., gateway selection, associated with broadcast of content, e.g., content from a long term evolution (LTE), broadcast (LTE-B) network(s) or enhanced multimedia broadcast multicast service (eMBMS) network(s).

BACKGROUND

By way of brief background, conventional multimedia broadcast multicast service (MBMS) generally employs low-context selection of network elements to carry content from a content provider to a consuming device. Further, these services are typically implemented in a rigid or semi-rigid configuration that may not perform well in dynamically evolving network topographies. The bearer paths are frequently manually updated and often do not reflect up-to-date network topologies, e.g., the conventional systems can fail to effectively learn the dynamics of the radio access and core network elements of a network in real-world which can result in network topology changes.

DETAILED DESCRIPTION

Figure 1:
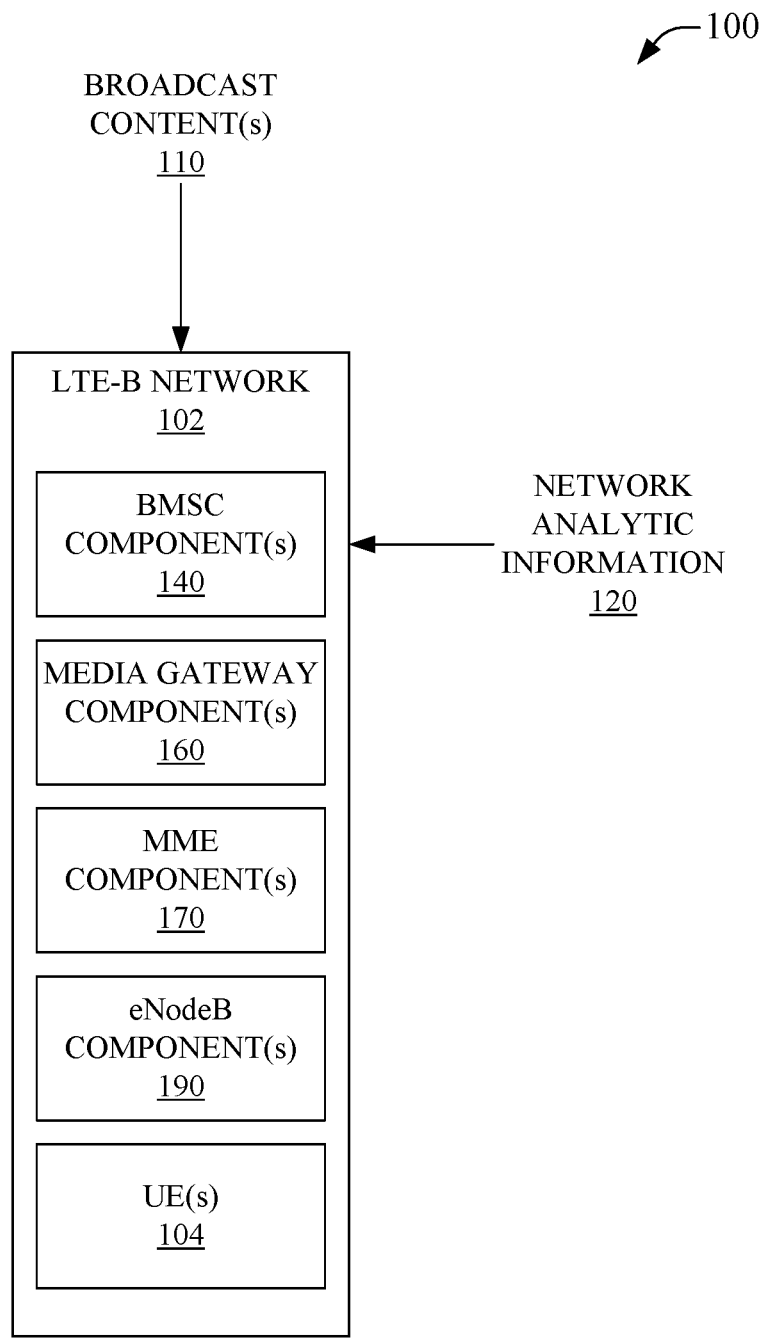
FIG. 1 is an illustration of an example system that facilitates network device selection for broadcast content in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional multimedia broadcast multicast service (MBMS) can rely on determining individual bearer paths to carry content from a service, e.g., server headend, etc., to a consuming device. Further, conventional MBMS techniques applied in long term evolution (LTE) technologies, e.g., as enhanced MBMS (eMBMS) or LTE-Broadcast (LTE-B), can fail to resolve issues that are often associated with the poor deployment of MBMS services. These services, e.g., MBMS and eMBMS, typically can be proprietary standalone services lacking coordination between the proprietary providers. MBMS generally lacks automation and, as such, MBMS systems often do not reflect up-to-date network topologies because the proprietary systems fail to learn the dynamics of the radio access and core network elements as well as network topology changes via conventional interfaces. Moreover, where these conventional technologies are 'siloed' there can be an inability to select other network components that can improve performance or can take advantage of other network devices associated with other regions. Of note, the term MBMS, eMBMS, and LTE-B, can each generally be used interchangeably in the present disclosure, except where specifically recited to illustrate a distinction from the other terms as will be appreciable to those of skill in the relevant arts.

In contrast to conventional systems that can be siloed and proprietary for each content delivery provider, network device selection for broadcast content as disclosed herein can enable selection of alternate network devices and/or components that can improve efficient use of the network and associated resources that are inherently limited, improve fault response, reduce propagation times for broadcast content, etc., via analysis of network topology and network characteristics associated with delivery of broadcast content. Network device selection for broadcast content can comprise real-time or near-real-time analysis of a topology of a LTE, or LTE-B, network associated with broadcasting content to a service area. Moreover, network device selection for broadcast content can employ the analysis of characteristics of one or more LTE networks, or portions thereof, associated with broadcast delivery to one or more service areas. As such, broadcast content providers can expect that network device selection for broadcast content, e.g., bearer paths between the broadcast content source and user equipments (UEs), can be kept current and can therefore better provide reliable content delivery to one or more UEs in one or more service areas in comparison to conventional techniques. Moreover, the network device selection for broadcast content can operate within components of the network itself, reducing additional burdens associated with deploying additional components to a network. Furthermore, network device selection for broadcast content can be responsive to evolving network characteristics, such as faults, latency, etc., and can therefore be responsive to said characteristics.

Conventional techniques can fail due to the complexities associated with mesh-type network device architectures and can impede broadcast content delivery to a service area in view of the dynamic nature of these complex mesh-type networks, for example, in self-organizing networks, especially those comprising small cell eNodeBs (eNBs), Wi-Fi access points (APs), etc., the devices comprising the network can be in nearly constant flux and can be coupled to multiple other network devices/components for any given service area. This complexity only increases with provisioning bearer paths for a plurality of service areas. Where broadcast content delivery systems are not updated frequently enough as to changes in the devices comprising the delivery network, faults, changes in network characteristics, etc., there can be significant failures to actually deliver broadcast content in conventional systems, e.g., routing data via edge devices that have left a service area, edge devices that are highly burdened, edge devices that are offline, etc. A benefit of network device selection for broadcast content is that it can, in some embodiments, be tightly integrated to network elements, e.g., having carrier-level access to LTE-B network components such as broadcast/multicast service center (BMSC) components, media gateway (MGW) components, mobility management entity (MME) components, eNBs, and even to UEs on a carrier-network. This integration can also be related to pools of BMSC, MGW, MME, etc., e.g., in a mesh-type network architecture, in one or more regions, allowing for network device selection for broadcast content that can better navigate a mesh-type environment than conventional techniques.

In an aspect, network component(s) can comprise network device selection for broadcast content features. In an embodiment, a BMSC component can comprise network device selection for broadcast content technology to enable LTE-B network component response to evolving network architecture and/or topology, fault remediation, and rule based network component selection. As an example, a BMSC component can be coupled to a plurality of MGW components and can accommodate ranking of the plurality of MGW to enable selection of a MGW that accommodates the broadcast content. Similarly, the example BMSC component can communicate with MGW and/or MME regional pools, e.g., one or more MGW and/or one or more MME component, one or more LTE radio access network (RAN) nodes, etc., to facilitate provision of high-speed mobility services comprising broadcast content. While not all MME components within a regional pool, or across one or more regional pools, and their respective serving RAN nodes may be eMBMS enabled during the initial broadcast service deployment phase, legacy MBMS services can also be accommodated to allow broadcast of content to network areas served by conventional technologies. In an aspect, the example BMSC component can be aware of underlying network topology design and can synchronize this to other BMSC components that can be part of a BMSC component pool to enable offloading of a session to another BMSC component that can be associated with desirable network characteristics, etc.

A device enabled for network device selection for broadcast content can manage, in one or more regions, one or more BMSC components, one or more MGW components, one or more MME components, one or more serving eNBs, etc., for one or more service areas, to allow selection of one or more bearer paths to enable LTE-B service in modern network architectures, including those comprising mesh-type architectures. These enabled devices can be responsive to reported LTE-B topology, or changes thereto, in real-time or near-real-time. Similarly, these enabled devices can analyze, in real-time or near-real-time, network characteristics, such as faults, lost packets, jitter, latency, etc., that can impact the efficacy of broadcast content and can be responsive to these characteristics. In an aspect, a network component, such as an enabled BMSC component, etc., can be 'aware' of the downstream network topology and associated characteristics when establishing or modifying LTE-B sessions. In some embodiments, an enabled device can participate in nodal configuration of a LTE-B network, construction of a mapping profile, and making the mapping profile available to other devices and/or systems in real-time or near-real-time. In other embodiments, an enabled device can receive network information, e.g., a mapping profile, and can locally leverage this network information in managing network device selection for broadcast content for network devices associated with delivery of broadcast content associated with a request received by the enabled device.

In an aspect, LTE-B architecture as disclosed herein can be utilized for effective broadcast content delivery, e.g., video services delivery, etc., over evolving LTE networks while preserving scarce spectrum resources. In a further aspect, emergency broadcasts that span across the coverage areas, e.g., SAI=0, etc., can be readily accommodated by enabled devices to help ensure that all downstream nodes are able to establish a LTE-B session successfully towards UEs so as to disseminate the emergency broadcast content. In another aspect, network device selection for broadcast content can provide for preservation of scares network resources such that establishing or modifying LTE-B session(s) has limited effects to traditional LTE mobility services such as data, voice over LTE (VoLTE), E911 etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates network device selection for broadcast content in accordance with aspects of the subject disclosure. System 100 can comprise long term evolution (LTE), broadcast (LTE-B) network 102. LTE-B network 102 can carry broadcast content(s) 110 from a content provider to a user, e.g., via UE(s) 104. LTE-B network can comprise one or more of broadcast/multicast service center (BMSC) component(s) 140, media gateway (MGW) component(s) 160, mobility management entity (MME) component(s) 170, eNodeB (eNB) component(s) 190, UE(s) 104, etc. In some embodiments, LTE-B can comprise a LTE network communicatively coupled to one or more BMSC component(s) 140.

LTE-B network 102 can receive network analytic information 120. In some embodiments, network analytic information 120 can be determined by another non-illustrated component. In other embodiments, network analytic information 120 can be received from LTE-B network 102 itself, or components comprising LTE-B network 102, e.g., network analytic information 120 can be received from one or more of BMSC component(s) 140, MGW component(s) 160, MME component(s) 170, eNB component(s) 190, UE(s) 104, etc. In an aspect, network analytic information 120 can comprise nodal interconnection information, e.g., mapping information related to LTE-B network 102, etc., information related to a characteristic(s) of LTE-B network 102 or the components comprising LTE-B network 102, etc. As an example, network analytic information 120 can comprise a map of LTE-B network 102 and latency reports related to one or more MGW component(s) 160 of LTE-B network 102. In an aspect, network analytic information 120 can also comprise similar information for another LTE-B network. In a further aspect, network analytic information 120 can comprise information related to a portion of a LTE-B network, e.g., a portion of LTE-B network 102 or a portion of another LTE-B network.

LTE-B network 102 can send and receive network analytic information within LTE-B network 102, components thereof, with another LTE-B network or portions thereof, etc. This network analytic information 120 can comprise topology information, provisioning information, performance information, traffic information, utilization information, historical information, etc. As an example, network analytic information 120 can comprise information related to the topology of LTE-B network 102 and information indicating service area associated with edge devices of LTE-B network 102, e.g., eNB component(s) 190 coverage areas. As another example, network analytic information 120 can comprise information indicating that a MGW component 160 is scheduled to be offline for service/repair at a future date/time, such that this information can be employed in determining a topology mapping profile associated with said date/time that reflects a lower ranking of MGW component 160 and a higher ranking for other MGW components 160 to maintain broadcast coverage to service areas that would normally be served by the anticipated offline MGW component 160. As a further example, network analytic information 120 can comprise information related to an indication that an eNB component 190 is highly burdened such that an alternative eNB 190 can be selected, e.g., via a mapping profile, to enable establishment of a new FTE-B session or maintenance or an existing FTE-B session in the service area of the burdened eNB 190, e.g., traffic balancing and load shifting can be enabled for LTE-B via the instant disclosure. As a still further example, newly added, or deleted, femtocells (not illustrated) can be reflected in a topology map wherein information related to the addition or removal of the femtocells is comprised in network analytic information.

In some embodiments, a carrier-network operating an LTE network has ready access to the types of information that can comprise network analytic information 120 as disclosed herein. This information can be communicated to LTE-B network management component 102 by core-network components of the carrier network via network analytic information 120. As such, network device selection for broadcast content as disclosed herein can offload management and analysis of a LTE-B network from a content broadcaster(s), e.g., the broadcaster can request establishment of a session(s) and network device selection for broadcast content can be managed by components of LTE-B network 102, e.g., via a network device selection enabled BMSC component(s) 140, etc. This can allow the broadcaster to focus on content to be broadcast to a UE without needing to directly analyze or manage network component architecture or determining a bearer path for broadcast content.

In an aspect, LTE-B network 102 or components thereof, e.g., enabled device, can adapt the configuration of LTE-B network 102. In an embodiment, an enabled device, e.g., network device selection enabled BMSC component(s) 140, etc., can manage LTE-B network 102 in response to network analytic information 120 received by LTE-B network 102 or components thereof, e.g., the enabled BMSC component 140, etc. As an example, an enabled device can direct alterations to the topology of LTE-B network 102 to, for example, move LTE-B sessions from a first burdened eNB component 190 to another less burdened eNB component 190 in response to receiving information that the first eNB 190 is burdened. As another example, an enabled device can restrict LTE-B via a newly added network edge device, e.g., a newly added Wi-Fi AP, etc., until a history of effective service has been established. As a further example, an enabled device can restrict LTE-B via a network edge device, e.g., a femtocell, etc., based on historical information reflecting spotty LTE-B service and, in some instances, the spotty edge device can be removed, e.g., temporarily or permanently blacklisted, etc., from LTE-B network 102, although it may remain in a LTE network for purposes other than LTE-B content broadcasts. In another aspect, an enabled device can perform analysis of, and/or operations on information received network analytic information 120 that, in some instances, can reflect a real-time, or near-real-time, state or condition of LTE-B network 102.

An enabled device, e.g., network device selection enabled BMSC component(s) 140, etc., can determine establishment of LTE-B sessions based on network analytic information 120. In some embodiments, additional information can also be included in demining LTE-B session establishment, provisioning, maintenance/updating of existing sessions, etc. As an example, broadcast content 110, can be analyzed by an enabled device or component of LTE-B network 102, such as verifying broadcast content 102 complies with one or more rules. Rules can relate to encoding, resolution, content restrictions, content classification, rights to broadcast the content, or nearly any other aspect related to the content. In an example, broadcast content 102 can be determined, by an enabled device of LTE-B network 102, e.g., network device selection enabled BMSC component(s) 140, etc., to comprise copyrighted material without an applicable license or permission for broadcast of the copyrighted material, whereby the enabled device can restrict establishing LTE-B sessions in accord with reducing piracy of content. In a further example, objectionable or illegal content can be restricted, e.g., child pornography, dissemination of classified materials, etc. In another example, based on a LTE-B network topology determined by an enabled device of LTE-B network 102 from network analytic information 120, and information related to broadcast content(s) 110, LTE-B sessions can be adapted to increase the quality of delivered content where LTE-B network 102 is underutilized, or to restrict the quality of delivered content where LTE-B network 102 is burdened, in accord with customer agreements for both the provider of the broadcast content(s) 110 and the customers associated with UE(s) 104, e.g., via customer profile information comprised in network analytic information 120, etc.

As LTE-B networks, e.g., 102, become more ubiquitous and of increasing complexity, management of the LTE-B network and of the LTE-B related services becomes increasingly relevant in contrast to conventional techniques that are generally proprietary and have limited ability to interact with the LTE-B network in a timely manner. As an example, conventional techniques can result in numerous vertically integrated broadcast services that each require separate maintenance and updating, e.g., 'siloing', which can actually increase backend traffic associated with a LTE-B network, e.g., 102, by increasing traffic associated with receiving requests for topology information from numerous broadcast services, replying to each of those proprietary broadcast services, and little ability to adapt the LTE-B network itself in response to competing requests from these multiple broadcast services. In contrast, the presently disclosed subject matter provides for a plurality of broadcast services, wherein the maintenance and management of LTE-B network 102 is not performed by numerous competing broadcast services. Moreover, broadcast content itself, e.g., 110, can play a role in LTE-B session establishment or maintenance, allowing for effective quality control with regard to the broadcast content. This can aid in effective dissemination of the broadcast content that accords with the condition of LTE-B network 102, as well as customer agreements, service provider agreements, etc., piracy protection, restrictions based on the subject matter of the broadcast content, e.g., illegal and/or immoral materials, etc.

In some embodiments, components of system 100 can be tightly integrated with systems associated with the control and management of an LTE network, e.g., administered by carrier network core-components. Given that carriers already manage LTE networks, it can readily be appreciated that facilitating management of LTE-B networks and service, as disclosed herein, is highly complementary. Moreover, where carriers can virtualize their core-networks, the present disclosure can allow for highly flexible deployments, such as enabling mobile virtual network operators (MVNOs) to deploy separate instances of network device selection for broadcast content that can be tailored to the MVNO while still remaining responsive to LTE-B network 102 self-analysis, network self-management, service self-management, etc.

In some embodiments, multiple broadcast content providers can introduce content, e.g., 110, to LTE-B network 102, e.g., via any enabled BMSC component(s) 140. The several content packages, or streams, can be routed to the correct service areas for each stream in a manner that is typically more efficient and more fault tolerant than several discrete proprietary MBMS providers could provide. In an aspect, network device selection enabled devices can then facilitate establishment of new LTE-B sessions or updating of existing LTE-B sessions based on the network analytic information 120 received in view of the several individual content streams. This, in comparison to conventional techniques, can reduce the redundancy of components associated with deploying multiple proprietary systems on top of an LTE network in an effort to accomplish similar results.

Figure 2:
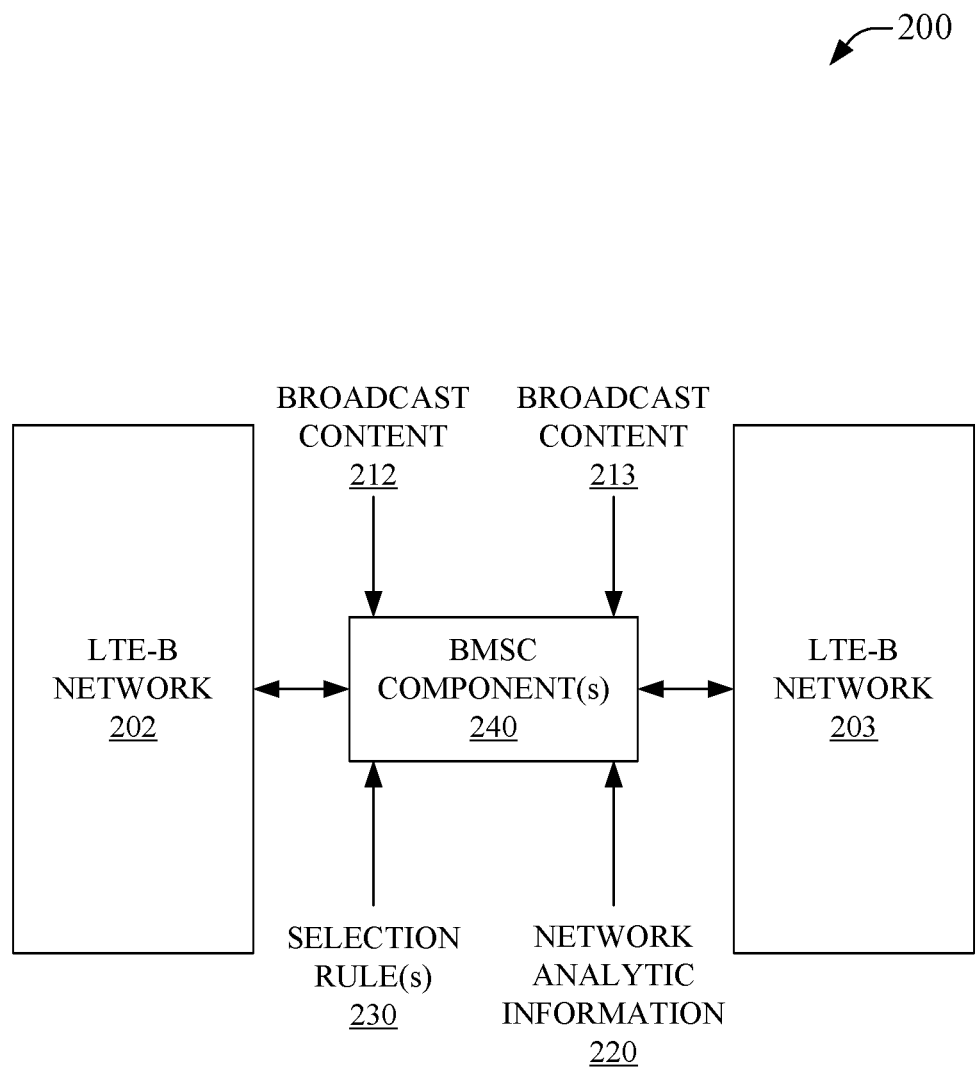
FIG. 2 is a depiction of an example system that facilitates network device selection for broadcast content among a plurality of broadcast service areas in accordance with aspects of the subject disclosure.

FIG. 2 is a depiction of a system 200 that can facilitate network device selection for broadcast content among a plurality of broadcast service areas in accordance with aspects of the subject disclosure. System 200 can comprise LTE-B network 202 and 203. These LTE-B networks can carry broadcast content(s), e.g., 212, 213, etc., from a content provider to a user. The LTE-B networks can comprise one or more network device selection enabled components, not illustrated for clarity and brevity, such as an enabled BMSC component in addition to BMSC component(s) 240, an enabled MGW component, an enabled MME component, an enabled eNB component, an enabled UE, etc. In some embodiments, LTE-B network 202 or 203 can comprise a LTE network communicatively coupled to one or more BMSC component(s) 240.

BMSC component(s) 240 is enabled to manage LTE-B network 202 or 203, based on network analytic information 220 or analysis thereof, alone or in conjunction with other information germane to management or establishment of a LTE-B session. In some embodiments, network analytic information 220 can be sourced from a LTE-B network, e.g., 202, 203, components thereof, etc. In other embodiments, network analytic information 220 related to a LTE-B network such as 202, 203, etc., can be determined by another non-illustrated component and made available to BMSC component(s) 240. In an aspect, network analytic information 220 can comprise nodal interconnection information, e.g., mapping information related to LTE-B network 202, 203, etc., information related to a characteristic(s) of LTE-B network 202, 203, etc., or the components comprising LTE-B network 202, 203, etc. As an example, network analytic information 220 can comprise a map of LTE-B network 202 and latency reports related to one or more MME component(s) of LTE-B network 203. In an aspect, network analytic information 220 can also comprise similar information for another LTE-B network, not illustrated. In a further aspect, network analytic information 220 can comprise information related to a portion of a LTE-B network, e.g., a portion of LTE-B network 202, 203 or a portion of another LTE-B network. Further, LTE-B network 202 can send and receive network analytic information 220 within LTE-B network 202, components thereof, with another LTE-B network or portions thereof, etc., and LTE-B network 203 can perform similar operations.

Network analytic information 220 can comprise topology information, provisioning information, performance information, traffic information, utilization information, historical information, etc. As an example, network analytic information 220 can comprise information related to the topology of LTE-B network 202 and information indicating service area associated with edge devices of LTE-B network 203. As another example, network analytic information 220 can comprise information indicating that a MGW component of LTE-B network 203 is offline, whereby this information can be employed by BMSC component(s) 204 in selecting a MGW component of LTE-B network 202 as a substitute in existing or new LTE-B sessions. As a further example, network analytic information 220 can comprise information related to an indication that an eNB component is highly burdened such that an alternative eNB can be selected to enable establishment of a new FTE-B session or maintenance or an existing FTE-B session in the service area of the burdened eNB. As a still further example, newly added, or deleted, femtocells (not illustrated) can be reflected in a topology map wherein information related to the addition or removal of the femtocells is comprised in network analytic information.

In an aspect, BMSC component(s) 240 can be enabled to manage LTE-B networks, e.g., 202, 203, etc., or components thereof, based on network analytic information 220, e.g., BMSC component(s) 240 can adapt the configuration of LTE-B network 202, 203, etc. In an embodiment, BMSC component(s) 240 can manage LTE-B network 202, 203, etc., in response to receiving network analytic information 220. As an example, BMSC component(s) 240 can direct alterations to the topology of LTE-B network 202, 203, etc., to, for example, move LTE-B sessions from a first burdened eNB component of LTE-B network 202 to another less burdened eNB component of LTE-B network 203. As another example, BMSC component(s) 240 can restrict LTE-B sessions employing a newly added network edge device, e.g., a newly added Wi-Fi AP, etc., until a history of effective service has been established. As a further example, BMSC component(s) 240 can increase LTE-B sessions employing a network edge device, e.g., a femtocell, etc., based on historical information reflecting laudable service. In another aspect, BMSC component(s) 240 can perform analysis of, and/or operations on network analytic information 220 that, in some instances, can reflect a real-time, or near-real-time, state or condition of LTE-B network 202, 203, etc.

BMSC component(s) 240 can determine establishment of LTE-B sessions based on network analytic information 220. In some embodiments, additional information can also be included in demining LTE-B session establishment, provisioning, maintenance/updating of existing sessions, etc. As an example, broadcast content 212, 213, etc., can be analyzed by BMSC component(s) 240, such as verifying broadcast content, e.g., 212, 213, etc. complies with one or more rules. Rules can relate to encoding, resolution, content restrictions, content classification, rights to broadcast the content, or nearly any other aspect related to the content. In an example, broadcast content 212 can be analyzed, by BMSC component(s) 240, in view of a LTE-B network topology from network analytic information 220, resulting in a determination that broadcast traffic can be shifted, e.g., by establishing additional LTE-B sessions, from LTE-B network 202 where LTE-B network 203 is underutilized.

In some embodiments, components of system 200 can be tightly integrated with systems associated with the control and management of an LTE network, e.g., administered by carrier network core-components. Given that carriers already manage LTE networks, it can readily be appreciated that facilitating management of LTE-B networks and service, e.g., via BMSC component(s) 240, is highly complementary. Moreover, where carriers can virtualize their core-networks, the present disclosure can allow for highly flexible deployments, such as enabling mobile virtual network operators (MVNOs) to deploy separate instances of BMSC component(s) 240 for network device selection for broadcast content tailored to the MVNO while still remaining responsive to LTE-B network 202, 203, etc., analysis, network management, service management, etc.

In some embodiments, multiple broadcast content providers can introduce content, e.g., 212, 213, etc., to LTE-B networks, e.g., 202, 203, etc., via BMSC component(s) 240. The several content packages, or streams, can be routed to the correct service areas for each stream in a manner that is can be more efficient and more fault tolerant than several discrete proprietary LTE-B providers can provide. In an aspect, BMSC component(s) 240 can facilitate establishment of new LTE-B sessions or updating of existing LTE-B sessions based on the network analytic information 220 and in view of the several individual content streams, 212, 213, etc., reducing the redundancy of components associated with deploying multiple conventional systems on top of an LTE network in an effort to accomplish similar results.

In an aspect, BMSC component(s) 240 can receive selection rule(s) 230. Selection rule(s) 230 can be related to selection of network components comprising LTE-B networks, e.g., 202, 203, etc., in view of network analytic information 220, supplemental information, or information derived from analysis of network analytic information 220 by BMSC component(s) 240. In an embodiment, selection rule(s) 230 can be related to designating a primary BMSC component 240. A primary BMSC component 240 can act as a fixed point of entry for broadcast content 212, 213, etc. In some instance, a primary BMSC component, e.g., 240, etc., can be designated due to geographic proximity to a broadcast content source, a broadcast content provider, etc. As an example, a BMSC component(s) 240 can be designated as a primary BMSC component 240 based on it being co-located with a content server hosting broadcast content, e.g., 212, 213, etc. It will be noted that a primary BMSC component 240, can designate another BMSC component(s) 240 in establishing or adapting a LTE-B session based on network analytic information 220. As an example, a primary BMSC component 240 can designate another BMSC component(s) 240 in establishing a LTE-B session in response to locating another cache/mirror of broadcast content 212, 213, etc., that is located proximate to the other BMSC component(s) 240 and would provide broadcast with lower latency.

Selection rule(s) 230 can further relate to characteristics of elements of an LTE-B network, e.g., 202, 203, etc., that can be provisioned in a bearer path for broadcast content delivery. Nearly any rule can be considered within the scope of the presently disclosed subject matter and these can not all be enumerated for the sake of clarity and brevity. Some examples of selection rule(s) 230 can include use of network components located only in a designated region/country, explicitly not in a region/country, etc., use of network components associated with a scoring metric, such as related to latency, jitter, uptime, etc., use of network components associated with certain monetary costs or other costs, etc., use of network components of/not of a certain brand, use of network components employing/not employing identified software or software versions or patches, etc. As will be appreciated, by one of skill in the relevant art, all such information can readily be comprised in network analytic information 220, etc., and employed by BMSC component(s) 240 in conjunction with selection rule(s) 230 when determining establishment or modification of a LTE-B session.

Figure 3:
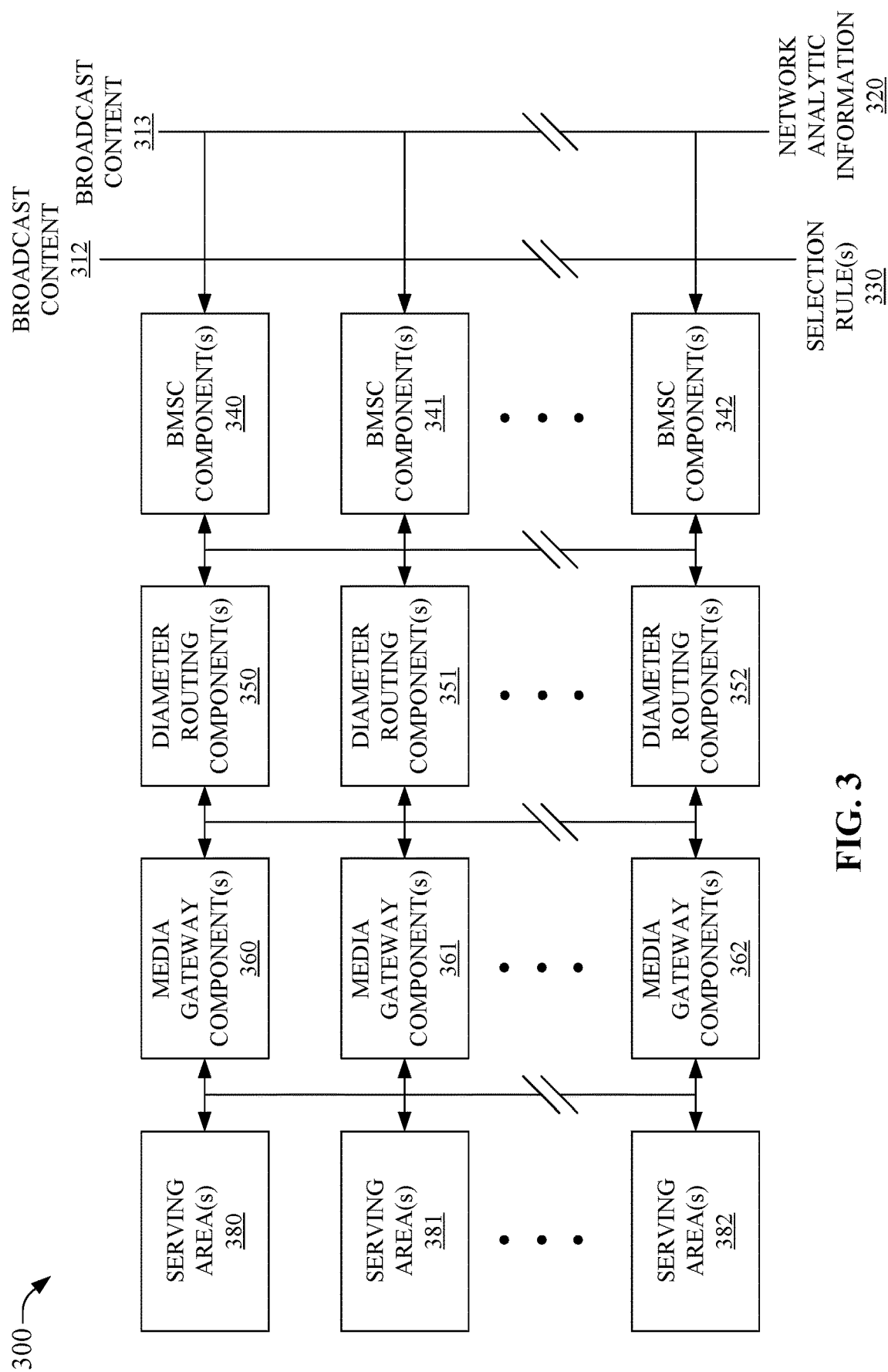
FIG. 3 illustrates an example system that facilitates network device selection for broadcast content among a plurality of network device pools in accordance with aspects of the subject disclosure.

FIG. 3 illustrates a system 300 that facilitates network device selection for broadcast content among a plurality of network device pools in accordance with aspects of the subject disclosure. System 300 can comprise LTE-B networks, not illustrated, or components thereof, e.g., BMSC component(s) 340-342, etc., MGW component(s) 360-362, etc., or other components as disclosed herein. These LTE-B networks of their components can carry broadcast content, e.g., 312, etc., from a content provider to a user. The LTE-B networks can comprise one or more network device selection enabled components, such as an enabled BMSC component, e.g., BMSC component(s) 340-342, etc. In some embodiments, an LTE-B network can comprise a LTE network communicatively coupled to one or more BMSC component(s) 340-342, etc.

BMSC component(s) 340-342, etc., are enabled to manage LTE-B networks, based on network analytic information 320, or analysis thereof, alone or in conjunction with other information germane to management or establishment of a LTE-B session. In some embodiments, network analytic information 320 can be sourced from a LTE-B network, components thereof, etc. In other embodiments, network analytic information 320 related to a LTE-B network can be determined by another non-illustrated component and made available to BMSC component(s) 340-342, etc. In an aspect, network analytic information 320 can comprise nodal interconnection information, e.g., mapping information related to a LTE-B network, information related to a characteristic(s) of a LTE-B network or the components comprising a LTE-B network. Network analytic information 320 can comprise topology information, provisioning information, performance information, traffic information, utilization information, historical information, etc.

In an aspect, BMSC component(s) 340-342, etc., can be enabled to manage LTE-B networks, or components thereof, based on network analytic information 320, e.g., BMSC component(s) 340-342, etc., can adapt the configuration of one or more LTE-B networks. In an embodiment, BMSC component(s) 340-342, etc., can manage one or more LTE-B networks in response to receiving network analytic information 320. As an example, BMSC component(s) 340-342, etc., can direct alterations to the topology of a LTE-B network to, for example, move LTE-B sessions from a first LTE-B network to another LTE-B network. In another aspect, BMSC component(s) 340-342, etc., can perform analysis of, and/or operations on network analytic information 320 that, in some instances, can reflect a real-time, or near-real-time, state or condition of one or more LTE-B networks BMSC component(s) 340-342, etc., can determine establishment of LTE-B sessions based on network analytic information 320. In some embodiments, additional information can also be included in demining LTE-B session establishment, provisioning, maintenance/updating of existing sessions, etc. As an example, broadcast content 312, 313, etc., can be analyzed by BMSC component(s) 340-342, etc., such as verifying broadcast content, e.g., 312, 313, etc. complies with one or more rules. Rules can relate to encoding, resolution, content restrictions, content classification, rights to broadcast the content, or nearly any other aspect related to the content. In an example, broadcast content 312 can be analyzed, by BMSC component(s) 340-342, etc., in view of one or more LTE-B network topologies from network analytic information 320, resulting in a determination that broadcast traffic can be shifted, e.g., by establishing additional LTE-B sessions, between LTE-B networks or components thereof.

In some embodiments, components of system 300 can be tightly integrated with systems associated with the control and management of an LTE network, e.g., administered by carrier network core-components, e.g., diameter routing component(s) 350-352, etc. Given that carriers already manage LTE networks, it can readily be appreciated that facilitating management of LTE-B networks and services, e.g., via BMSC component(s) 340-342, etc., can be highly complementary.

In some embodiments, multiple broadcast content providers can introduce content, e.g., 312, 313, etc., to LTE-B network via BMSC component(s) 340-342, etc. The several content packages, or streams, can be routed to the correct service areas, e.g., service area(s) 380-382, etc., for each stream in a manner that is can be more efficient and more fault tolerant than several discrete proprietary LTE-B providers can provide. In an aspect, BMSC component(s) 340-342, etc., can facilitate establishment of new LTE-B sessions or updating of existing LTE-B sessions based on the network analytic information 320 and in view of the several individual content streams, 312, 313, etc., reducing the redundancy of components associated with deploying multiple conventional systems on top of an LTE network in an effort to accomplish similar results.

In an aspect, BMSC component(s) 340 can receive selection rule(s) 330. Selection rule(s) 330 can be related to selection of network components comprising LTE-B networks in view of network analytic information 320, supplemental information, or information derived from analysis of network analytic information 320 by BMSC component(s) 340-342, etc. In an embodiment, selection rule(s) 330 can be related to designating a primary BMSC component, e.g., from 340-342, etc. A primary BMSC component can act as a fixed point of entry for broadcast content 312, 313, etc. In some instances, a primary BMSC component can be designated due to geographic proximity to a broadcast content source, a broadcast content provider, etc. It will be noted that a primary BMSC component, can designate another BMSC component(s) 340-342, etc., in establishing or adapting a LTE-B session based on network analytic information 320. Selection rule(s) 330 can further relate to characteristics of elements of an LTE-B network, or components thereof, that can be provisioned in a bearer path for broadcast content delivery. Nearly any rule can be considered within the scope of the presently disclosed subject matter and these can not all be enumerated for the sake of clarity and brevity.

System 300 illustrates the increasing complexity of mesh-type networks expected in the evolution of LTE-B networks. As illustrated, any BMSC component(s) 340-342, etc., can be communicatively coupled to any other BMSC component(s) 340-342, etc., as well as to any MGW component(s) 360-362, etc., via any diameter routing component(s) 250-352, etc. Moreover, any of serving area(s) 380-382, etc., can be communicatively coupled to any MGW component(s) 360-362, etc. As such, routing one or more of broadcast content 312, 313, etc., to one or more UEs proximate to one or more serving area(s) 380-382, etc., can follow a massive number of bearer paths between the one or more content providers and the one or more UEs. This highly complex and evolving mesh-type architecture poses a major hurdle to conventional LTE-B technologies in contrast to the presently disclosed subject matter.

Where BMSC component(s) 340-342, etc., are enabled to manage establishment or adaption of LTE-B sessions across the components illustrated in system 300, based on network analytic information 320 of analysis thereof, in some instance in conjunction with other information as disclosed herein, the presently disclosed subject matter provides avenues to manage LTE-B sessions in a scalable manner. As an example, a first BMSC component(s), e.g., one of 340-342, etc., can receive broadcast content 312 and, based on network analytic information 320, can establish an LTE-B session comprising one of MGW component(s) 360-362, etc., via one of diameter routing component(s) 350-352, etc., to route content 312 to one or more of serving area(s) 380-382, etc. Moreover, where the first BMSC component determines that employing another BMSC component of BMSC component(s) 340-342, etc., can provide a desired result, e.g., in view of selection rule(s) 330, etc., the established LTE-B session can be promptly modified to employ the other BMSC component in lieu of the first BMSC component. Similar control and management can be applied to selecting different diameter routing component(s), MGW component(s), serving area(s), etc., and, while all such similar control and management embodiments are expressly within the scope of the instant disclosure, these embodiments are not further expanded on for the sake of clarity and brevity.

Figure 4:
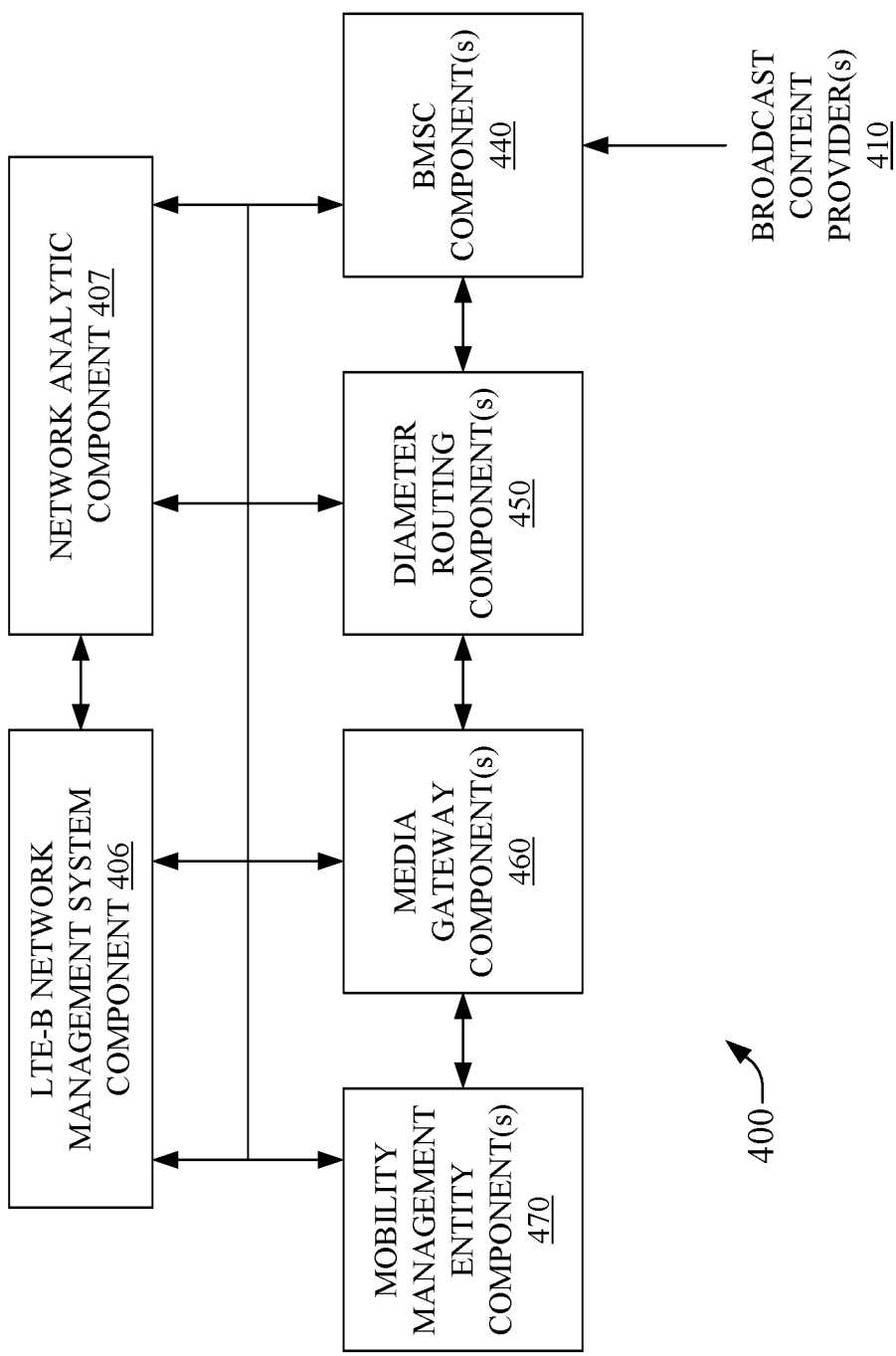
FIG. 4 illustrates an example system that facilitates network device selection for broadcast content in conjunction with a network management component and analytic component in accordance with aspects of the subject disclosure.

FIG. 4 illustrates a system 400 that facilitates network device selection for broadcast content in conjunction with a network management component and analytic component in accordance with aspects of the subject disclosure. System 400 can comprise a LTE-B network, not illustrated, or components associated therewith, e.g., BMSC component(s) 440, diameter routing component(s) 450, MGW component(s) 460, MME component(s) 440, etc. A LTE-B network can carry information from broadcast content provider(s) to a UE.

A LTE-B network, or constituent components, can receive network analytic information. In some embodiments, network analytic information can be determined by another component, e.g., LTE-B network management system component 406, network analytic component 407, etc. In other embodiments, network analytic information 420 can be received from the LTE-B network itself, or components comprising the LTE-B network, e.g., network analytic information 420 can be received from one or more of BMSC component(s) 440, MGW component(s) 460, MME component(s) 470, etc. In an aspect, network analytic information can comprise nodal interconnection information, e.g., mapping information related to the LTE-B network, information related to a characteristic(s) of the LTE-B network or the components comprising the LTE-B network, etc. As an example, network analytic information can comprise a map of a LTE-B network and round trip time reports related to one or more MGW component(s) 460 of the LTE-B network. In an aspect, network analytic information can also comprise similar information for another LTE-B network. In a further aspect, network analytic information can comprise information related to a portion of a LTE-B network or a portion of another LTE-B network.

A LTE-B network can send and receive network analytic information within the LTE-B network, components thereof, with another LTE-B network or portions thereof, etc. This network analytic information can comprise topology information, provisioning information, performance information, traffic information, utilization information, historical information, etc. In some embodiments, a carrier-network operating an LTE network has ready access to the types of information that can comprise network analytic information, as disclosed herein. This information can be communicated to LTE-B network management system component 406, network analytic component 407, etc. by core-network components of the carrier network, and then to the LTE-B network or components thereof. This can allow a broadcaster to avoid needing to directly analyze or manage network component architecture or determining a bearer path for broadcast content.

In an aspect, a LTE-B network, or components thereof, can adapt the configuration of the LTE-B network, based on information received from LTE-B network management system component 406, network analytic component 407, etc. In an embodiment, BMSC component(s) 440 can manage a LTE-B network in response to network analytic information received from LTE-B network management system component 406, network analytic component 407, etc. As such, BMSC component(s) 440 can direct alterations to the topology of a LTE-B network. In another aspect, BMSC component(s) 440 can perform analysis of, and/or operations on information received from LTE-B network management system component 406, network analytic component 407, etc., that in some instances, can reflect a real-time, or near-real-time, state or condition of a LTE-B network. BMSC component(s) 440 can determine establishment of LTE-B sessions based on network analytic information. In some embodiments, additional information can also be included in demining LTE-B session establishment, provisioning, maintenance/updating of existing sessions, etc. As an example, information received from broadcast content provider(s) 410, can be analyzed by BMSC component(s) 440, for example, to verifying satisfaction of one or more rules as disclosed herein. Rules can relate to encoding, resolution, content restrictions, content classification, rights to broadcast the content, or nearly any other aspect related to the content.

Figure 5:
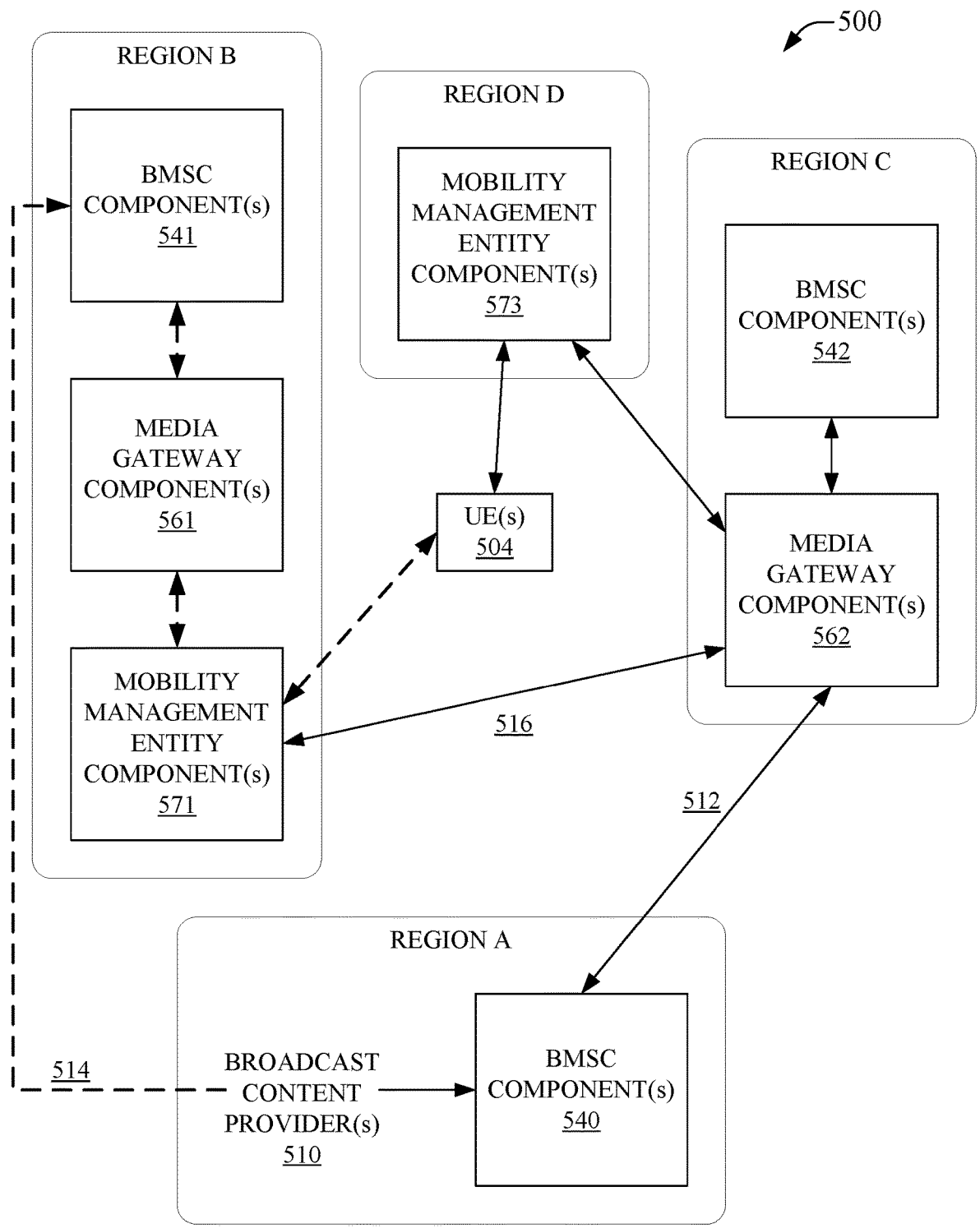
FIG. 5 illustrates an example system depicting network device selection for broadcast content for network devices in a plurality of regions in accordance with aspects of the subject disclosure.

FIG. 5 illustrates a system 500 that depicts network device selection for broadcast content for network devices in a plurality of regions in accordance with aspects of the subject disclosure. System 500 can comprise LTE-B network components, e.g., elements of LTE-B networks, distributed across a plurality of regions, e.g., region A-D. Broadcast content provider(s) 510, located in region A, can source content for broadcast to a service area comprising UE(s) 504. As such, a request for LTE-B session establishment can be communicated to BMSC component(s) 540 also conveniently located in region A. In some embodiments, BMSC component(s) 540 can be designated as a primary BMSC component with regard to content from broadcast content provider(s) 510, e.g., due to the proximity within region A.

BMSC component(s) 540 can receive network analytic information from regions A-D. This network analytic information can comprise topologies of the components illustrated in said regions, e.g., for BMSC component(s) 542 and MGW component(s) 562 of region C, MME component(s) of region D, etc. BMSC component(s) 540 can determine network topographies and characteristics for regions A-D. BMSC component(s) 540 can further adapt and manage the networks of region A-D, as disclosed herein.

As an example, of the analysis and management functions of BMSC component(s) 540, several bearer paths between broadcast content provider(s) 510 and UE(s) 504 can be determined and analyzed. A first bearer path can comprise link 512 between BMSC component(s) 540 and MGW component(s) 562, followed by additional links to MME component(s) 573 and then UE(s) 504. A second bearer path can comprise link 512 between BMSC component(s) 540 and MGW component(s) 562, followed by link 516 to MME component(s) 571 and then UE(s) 504. A third bearer path can comprise selecting BMSC component(s) 541 as a replacement for 540 and directing broadcast content provider(s) 510 to 541 via link 514. Subsequent links for bearer path three pass through MGW component(s) 561 and MME component(s) 571 and then to UE(s) 504 via the dashed link.

Comparison of these three bearer paths by BMSC component(s) 540 can result in selection of a favored bearer path and associated establishment, or in certain instances, modification of a LTE-B session to broadcast the content associated with the above request for LTE-B session establishment. As an example, where the first bearer path is associated with information indicating the MGW component (s) 562 and/or MME component(s) 573 are experiencing high latency, this can decrease the likelihood that the first bearer path with be employed. Where the second bearer path is operating normally, it can be preferred over the first bearer path. However, where the performance of the broadcast content is determined to be better for the third bearer path than the second, then the third bearer path can be selected and broadcast content provider(s) 510 can be handed off to BMSC component(s) 541 of region A for session establishment, e.g., via 514. Of note, the determination made by, and information gathered by, BMSC component(s) 540 can also be made available to BMSC component(s) 541, as well as to BMSC component(s) 542, or other LTE-B components in any of the regions A-D that are communicatively coupled to BMSC component(s) 540.

In the instant example, the second bearer path traverses at least three regions, e.g., region A, region C, and region B, before content is broadcast to UE(s) 504. In contrast, bearer path three traverses two regions, e.g., A and B. The components in the several regions of this example are considered proximate to each other within a region but different regions are not considered proximate to each other. As such, the performance of the second bearer path can be poorer than the third bearer path because broadcast content needs to be communicated between nodes at greater distances/times than in the third bearer path, e.g., the distance/time to traverse 512 and 516 is greater than 514. Thus, even where BMSC component(s) 540 can be located near the content source, e.g., both in region A, the effect of hopping between several regions can degrade performance more than reassigning the content to another BMSC, e.g., BMSC component(s) 541, wherein region B has a more complete LTE-B network in close proximity. It will be noted that additional complexity and additional bearer paths would result given that each or regions A-D can comprise a plurality of BMSC component(s), MGW component(s), or MME component(s), wherein there may be several different bearer paths between region A and C and several more between region C and D, etc. This additional complexity is discussed with regard to FIG. 3, and is not expounded on here for clarity and brevity, however all such additional bearer path options can be analyzed within the scope of the instant disclosure.

Figure 6:
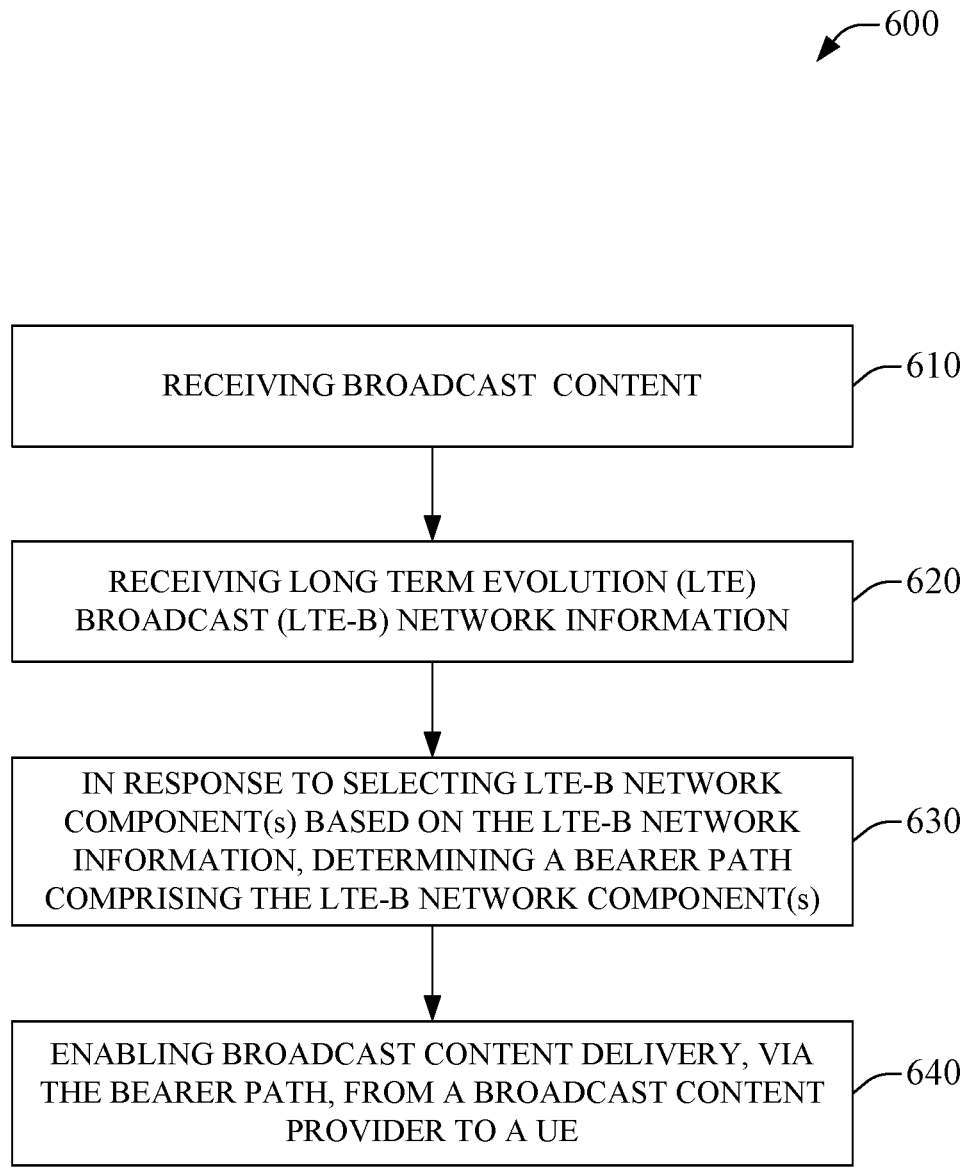
FIG. 6 illustrates an example method facilitating network device selection for broadcast content in accordance with aspects of the subject disclosure.
Figure 7:
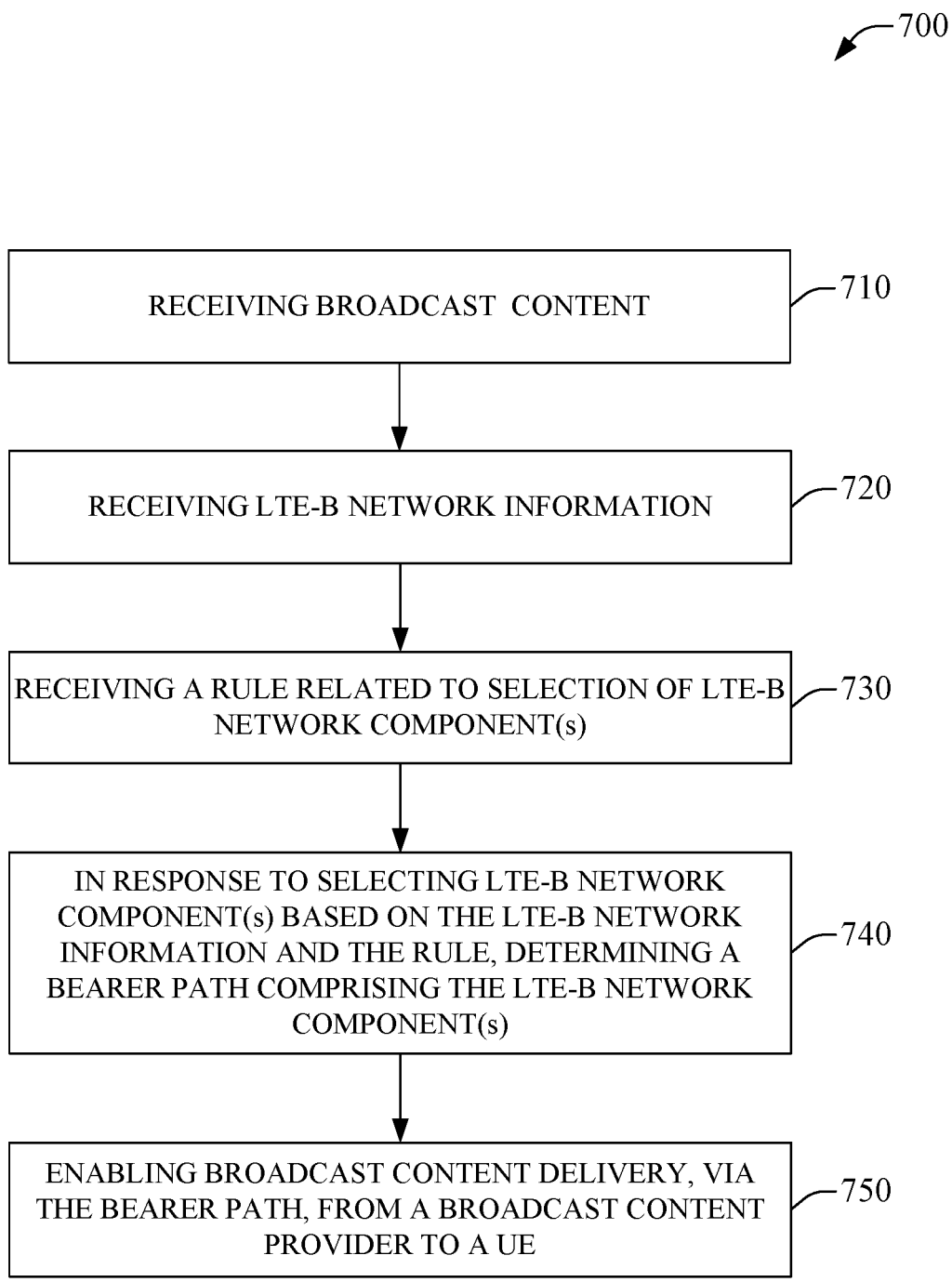
FIG. 7 depicts an example method facilitating network device selection for broadcast content subject to a selection rule in accordance with aspects of the subject disclosure.
Figure 8:
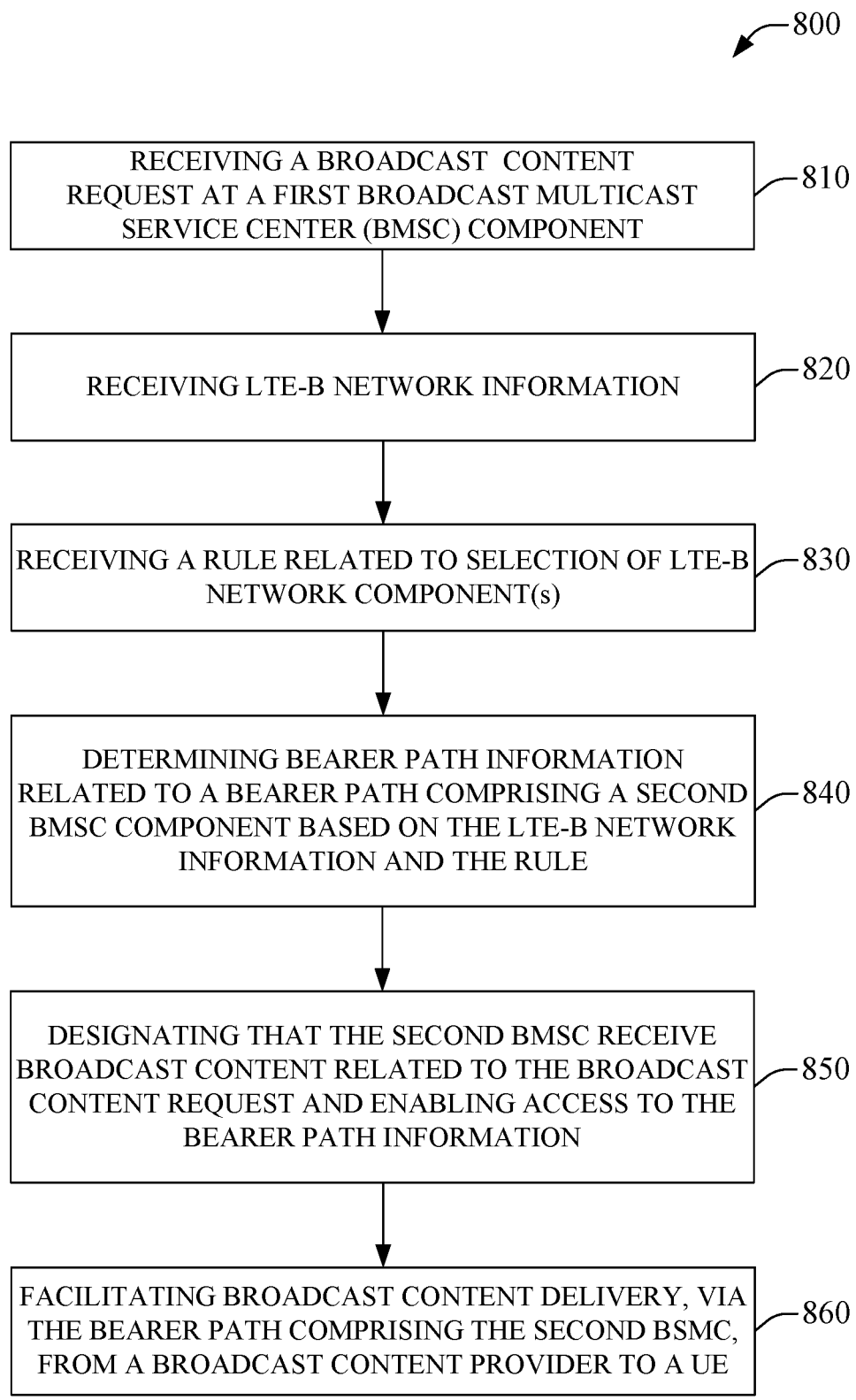
FIG. 8 illustrates an example method facilitating network device selection comprising a second BMSC component to facilitate broadcast content in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating network device selection for broadcast content in accordance with aspects of the subject disclosure. At 610, method 600 can comprise receiving broadcast content. At 620, LTE-B network information can be received in method 600. A LTE-B network can comprise one or more of broadcast/multicast service center (BMSC) component(s), media gateway (MGW) component(s), mobility management entity (MME) component(s), eNodeB (eNB) component(s), UE(s), etc. In some embodiments, LTE-B can comprise a LTE network communicatively coupled to one or more BMSC component(s). LTE-B network information can be received from one or more of BMSC component(s), MGW component(s), MME component(s), eNB component(s), UE(s), etc. In an aspect, LTE-B network information can comprise nodal interconnection information, e.g., mapping information related to one or more LTE-B network(s), etc., information related to a characteristic(s) of one or more LTE-B network(s) or the components comprising the LTE-B network(s), etc. As an example, LTE-B network information can comprise a map of one or more LTE-B network(s), latency reports related to one or more MGW component(s) of one or more LTE-B network(s), information related to a portion of one or more LTE-B network(s), etc.

At 630, method 600 can comprise determining a bearer path in response to selecting LTE-B network component(s) based on the LTE-B network information from 620. In an aspect, the bearer path can comprise the LTE-B network component(s). Moreover, the determining the bearer path can comprise ranking other determined bearer paths based on the LTE-B network information, supplementary information, and analysis of the LTE-B network information, etc., and selecting preferred bearer path from the one or more ranked bearer paths. In some embodiments, information related to the ranking, analysis, collection, etc., of LTE-B network information, supplementary information, analysis, etc., can be preserved, shared, etc., with other components of the one or more LTE-B networks. LTE-B network information can comprise topology information, provisioning information, performance information, traffic information, utilization information, historical information, etc. LTE-B network information can comprise information related to the topology of one or more LTE-B networks. This information can readily be sourced from a carrier-network operating an LTE network as disclosed herein. LTE-B network information can be communicated by core-network components of the carrier network.

At 640, method 600 can comprise enabling broadcast content delivery, via the determined bearer path from 630. At this point method 600 can end. Content delivery can be from a broadcast content provider to a UE. Enabling broadcast content delivery can comprise establishing a LTE-B session via the determined bearer path. In some embodiments, enabling the broadcast content delivery can further comprise providing some, none, or all, of the information related to the ranking, analysis, collection, etc., of LTE-B network information, supplementary information, analysis, etc., where preserved at 630.

FIG. 7 illustrates a method 700 that facilitates network device selection for broadcast content subject to a selection rule in accordance with aspects of the subject disclosure. At 710, method 700 can comprise receiving broadcast content. At 720, LTE-B network information can be received in method 700. A LTE-B network can comprise one or more of broadcast/multicast service center (BMSC) component(s), media gateway (MGW) component(s), mobility management entity (MME) component(s), eNodeB (eNB) component(s), UE(s), etc. In some embodiments, LTE-B can comprise a LTE network communicatively coupled to one or more BMSC component(s). LTE-B network information can be received from one or more of BMSC component(s), MGW component(s), MME component(s), eNB component(s), UE(s), etc. In an aspect, LTE-B network information can comprise nodal interconnection information, e.g., mapping information related to one or more LTE-B network(s), etc., information related to a characteristic(s) of one or more LTE-B network(s) or the components comprising the LTE-B network(s), etc. As an example, LTE-B network information can comprise a map of one or more LTE-B network(s), latency reports related to one or more MGW component(s) of one or more LTE-B network(s), information related to a portion of one or more LTE-B network(s), etc.

At 730, A rule related to selection of LTE-B network component(s) can be received in method 700. Rules can relate to encoding, resolution, content restrictions, content classification, rights to broadcast the content, or nearly any other aspect related to the broadcast content received at 710. In an example, broadcast content can be received, at 710, and can comprise copyright information, licensing information, objectionable or illegal content can be restricted, e.g., child pornography, dissemination of classified materials, etc. Rules can also related to ranking of bearer paths, e.g., latency sensitivity, financial or other types of cost parameters, user profile values, contractual terms with a customer or service provider, location/proximity of LTE-B network elements, etc.

At 740, method 700 can comprise, in response to selecting LTE-B network component(s) based on the LTE-B network information from 720 and the rule from 730, determining a bearer path comprising the LTE-B network component(s). Moreover, the determining the bearer path can comprise ranking other determined bearer paths based on the LTE-B network information, supplementary information, and analysis of the LTE-B network information, etc., and selecting preferred bearer path from the one or more ranked bearer paths. In some embodiments, information related to the ranking, analysis, collection, etc., of LTE-B network information, supplementary information, analysis, etc., can be preserved, shared, etc., with other components of the one or more LTE-B networks. LTE-B network information can comprise topology information, provisioning information, performance information, traffic information, utilization information, historical information, etc. LTE-B network information can comprise information related to the topology of one or more LTE-B networks. This information can readily be sourced from a carrier-network operating an LTE network as disclosed herein. LTE-B network information can be communicated by core-network components of the carrier network.

At 750, method 700 can comprise enabling broadcast content delivery, via the determined bearer path from 740. At this point method 700 can end. Content delivery can be from a broadcast content provider to a UE. Enabling broadcast content delivery can comprise establishing a LTE-B session via the determined bearer path. In some embodiments, enabling the broadcast content delivery can further comprise providing some, none, or all, of the information related to the ranking, analysis, collection, etc., of LTE-B network information, supplementary information, analysis, etc., where preserved at 740.

FIG. 8 illustrates a method 800 that facilitates network device selection comprising a second BMSC component to facilitate broadcast content in response to reporting topology in accordance with aspects of the subject disclosure. At 810, method 800 can comprise receiving a broadcast content request at a first broadcast multimedia service center (BMSC) component. A LTE-B network can comprise one or more of BMSC component(s), MGW component(s), MME component(s), eNB component(s), UE(s), etc. In some embodiments, LTE-B can comprise a LTE network communicatively coupled to one or more BMSC component(s).

At 820, LTE-B network information can be received in method 800. LTE-B network information can be received from one or more of BMSC component(s), MGW component(s), MME component(s), eNB component(s), UE(s), etc. In an aspect, LTE-B network information can comprise nodal interconnection information, e.g., mapping information related to one or more LTE-B network(s), etc., information related to a characteristic(s) of one or more LTE-B network(s) or the components comprising the LTE-B network(s), etc. As an example, LTE-B network information can comprise a map of one or more LTE-B network(s), latency reports related to one or more MME component(s) of one or more LTE-B network(s), information related to a portion of one or more LTE-B network(s), etc.

At 830, a rule related to selection of LTE-B network component(s) can be received. Rules can relate to encoding, resolution, content restrictions, content classification, rights to broadcast the content, or nearly any other aspect related to broadcast content. In an example, broadcast content can comprise copyright information, licensing information, objectionable or illegal content can be restricted, e.g., child pornography, dissemination of classified materials, etc. Rules can also be related to ranking of bearer paths, e.g., latency sensitivity, financial or other types of cost parameters, user profile values, contractual terms with a customer or service provider, location/proximity of LTE-B network elements, etc.

At 840, method 800 can comprise, determining bearer path information related to a bearer path comprising a second BMSC component. The determining bearer path information can be based on the LTE-B network information and the rule. Moreover, the determining the bearer path information can comprise ranking other bearer path information based on the LTE-B network information, supplementary information, analysis of the LTE-B network information, etc., and selecting a preferred bearer path from the one or more ranked bearer paths. In some embodiments, information related to the ranking, analysis, collection, etc., of LTE-B network information, supplementary information, analysis, etc., can be preserved, shared, etc., with other components of the one or more LTE-B networks. LTE-B network information can comprise topology information, provisioning information, performance information, traffic information, utilization information, historical information, etc. LTE-B network information can comprise information related to the topology of one or more LTE-B networks. This information can readily be sourced from a carrier-network operating an LTE network as disclosed herein. LTE-B network information can be communicated by core-network components of the carrier network.

At 850, method 800 can comprise, designating that the second BMSC component receive broadcast content related to the broadcast content request and enabling access to the bearer path information. This aspect of method 800 relates to selecting another BMSC component, such as when employing the second BMSC component as part of a bearer path ranks preferable to a similar path employing the first BMSC component. As disclosed herein, this can occur due to proximity between the broadcast content source and the first and second BMSC components, underutilization of the second BMSC component, over utilization of the first BMSC component, etc.

At 860, method 800 can comprise facilitating broadcast content delivery, via the bearer path comprising the second BMSC component. At this point method 800 can end. Content delivery can be from a broadcast content provider to a UE, via the bearer path comprising the second BMSC component. Facilitating broadcast content delivery can comprise establishing a LTE-B session via the bearer path comprising the second BMSC component. In some embodiments, enabling the broadcast content delivery can further comprise providing some, none, or all, of the information related to the ranking, analysis, collection, etc., of LTE-B network information, supplementary information, analysis, etc., where preserved at 840.

Figure 9:
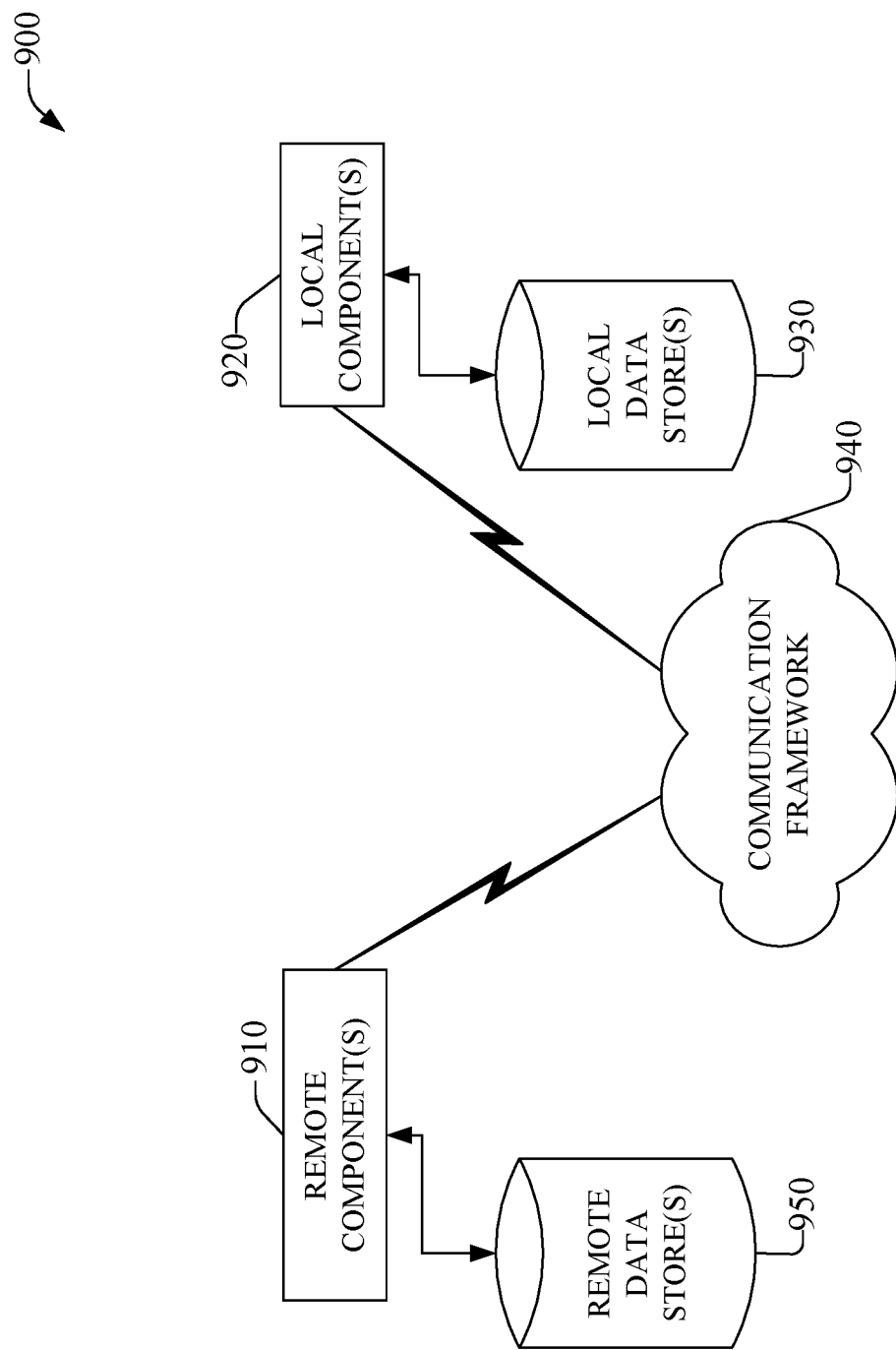
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be BMSC component(s) 140, 240, 340-342, 440, 540-542, etc., diameter routing component(s) 350-352, etc., LTE-B network management system component 406, network analytic component 407, etc.

The system 900 also comprises one or more local component(s) 920. The local component(s) 920 can be hardware and/or software (e.g., threads, processes, computing devices). In some embodiments, local component(s) 920 can comprise, for example, LTE-B network 102, 202, 203, etc., BMSC component(s) 140, 240, 340-342, 440, 540-542, etc., diameter routing component(s) 350-352, etc., LTE-B network management system component 406, network analytic component 407, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
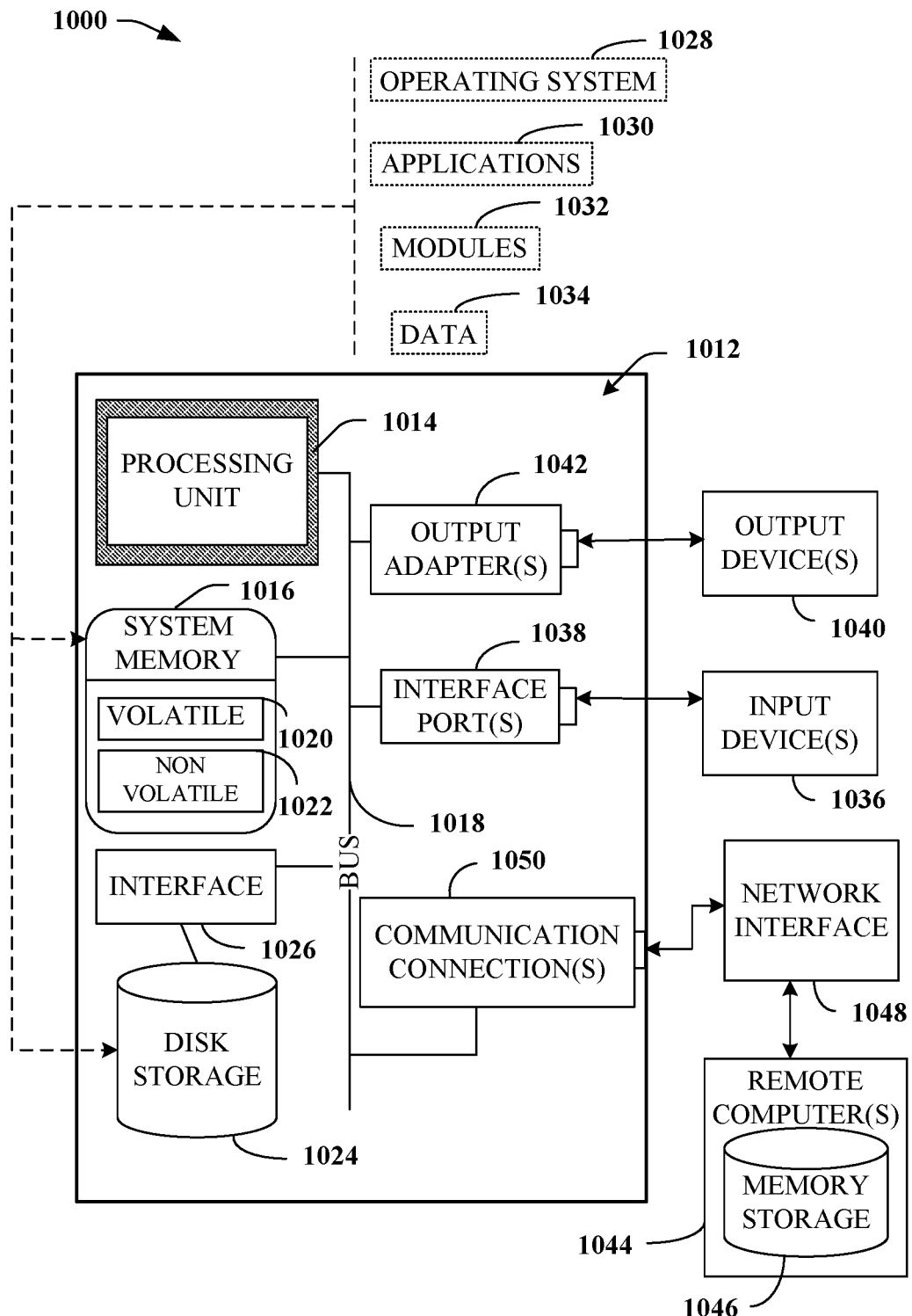
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, LTE-B network 102, 202, 203, etc., BMSC component(s) 140, 240, 340-342, 440, 540-542, etc., diameter routing component(s) 350-352, etc., MGW component(s) 160, 360-362, etc., 460, 560, 562, etc., MME component(s) 170, 470, 571, 573, etc., LTE-B network management system component 406, network analytic component 407, etc., UE 104, 504, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UI Component 252 can receive touch, motion, audio, visual, or other types of input. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining that an adapted bearer path satisfies a selection rule based on a rank of the adapted bearer path relative to adapted bearer paths, wherein the adapted bearer path is an alteration of a bearer path of a long term evolution broadcast network communicating long term evolution broadcast data via a first device, wherein the alteration of the bearer path alters which devices comprise the bearer path, wherein the alteration of the bearer path supports transport of the long term evolution broadcast data between a broadcast source device and a user equipment via the adapted bearer path, wherein the rank is based on a historical performance of the long term evolution broadcast network, and wherein the adapted bearer path comprises a second device; and
        adapting an existing long term evolution broadcast session based on the alteration of the bearer path facilitating continued communication of the long term evolution broadcast data between the broadcast source device and the user equipment via the adapted bearer path.

2. The system of claim 1, wherein the rank of the adapted bearer path is based on a content propagation time via the long term evolution broadcast network.

3. The system of claim 2, wherein the rank of the adapted bearer path is based on a fault response time of the long term evolution broadcast network.

4. The system of claim 1, wherein the alteration of the bearer path results in the adapted bearer path comprising the second device and not comprising the first device.

5. The system of claim 1, wherein the alteration of the bearer path results in the adapted bearer path comprising the second device and the first device.

6. The system of claim 1, wherein the long term evolution broadcast data comprises multimedia broadcast multicast service data.

7. The system of claim 1, wherein the long term evolution broadcast data comprises enhanced multimedia broadcast multicast service data.

8. The system of claim 1, wherein the adapted bearer path increases a fault response in comparison to the bearer path.

9. The system of claim 1, wherein the adapted bearer path reduces propagation times for broadcast content in comparison to the bearer path.

10. The system of claim 1, wherein the determining that the adapted bearer path satisfies the selection rule occurs in near real time.

11. The system of claim 1, wherein the processor is comprised in network equipment of the long term evolution broadcast network.

12. A method, comprising:
    determining, by a system comprising a processor and a memory, an updated bearer path based on an alteration of a presently used bearer path of a long term evolution broadcast network communicating long term evolution broadcast data via a first long term evolution broadcast network device, wherein the alteration results in the updated bearer path comprising a different device than the presently used bearer path before the alteration, wherein the updated bearer path comprises a second long term evolution broadcast network device, wherein the presently used bearer path facilitates communication of content between a broadcast source device and a broadcast receiving device, and wherein the updated bearer path enables continued communication of the content between the broadcast source device and the broadcast receiving device; and
    in response to selecting the updated bearer path based on a rank of the updated bearer path relative to other updated bearer paths, altering, by the system, the presently used bearer path to allow the continued communication of the content via the updated bearer path, wherein the selecting is based on a historical performance of the long term evolution broadcast network.

13. The method of claim 12, wherein the selecting the updated bearer path based on the rank of the updated bearer path relative to the other updated bearer paths is based on a fault response time of the long term evolution broadcast network.

14. The method of claim 12, wherein the selecting the updated bearer path based on the rank of the updated bearer path relative to the other updated bearer paths is based on a content propagation time via the long term evolution broadcast network.

15. The method of claim 12, wherein the updated bearer path comprises the second long term evolution broadcast network device and does not comprise the first long term evolution broadcast network device.

16. The method of claim 12, wherein the updated bearer path comprises the second long term evolution broadcast network device and the first long term evolution broadcast network device.

17. A non-transitory computer readable storage device comprising executable instructions that, in response to execution, cause a system comprising a processor to perform operations, comprising:
    selecting an altered bearer path that satisfies a selection rule based on a determined rank of the altered bearer path relative to other altered bearer paths, wherein the rank is based on a historical performance of a long term evolution broadcast network, wherein the altered bearer path is based on an instant bearer path of the long term evolution broadcast network communicating long term evolution broadcast data via a first long term evolution broadcast network device, wherein the altered bearer path comprises at least one different device than the instant bearer path, wherein the altered bearer path comprises a second long term evolution broadcast network device, and wherein the altered bearer path facilitates continued transport of the long term evolution broadcast data via the altered bearer path; and
    initiating implementation of the altered bearer path to support the continued transport of the long term evolution broadcast data for an instant long term evolution broadcast session via the altered bearer path.

18. The non-transitory computer readable storage device of claim 17, wherein the altered bearer path comprises the second long term evolution broadcast network device and does not comprise the first long term evolution broadcast network device.

19. The non-transitory computer readable storage device of claim 17, wherein the altered bearer path comprises the second long term evolution broadcast network device and the first long term evolution broadcast network device.

20. The non-transitory computer readable storage device of claim 17, wherein the altered bearer path improves a fault response in comparison to the instant bearer path.

* * * * *